United States Patent [19]

Janssens

[11] Patent Number: 5,239,543
[45] Date of Patent: Aug. 24, 1993

[54] COMMUNICATION SYSTEM AND A CENTRAL PROCESSING UNIT AS WELL AS A COMMUNICATION STATION IN THE COMMUNICATION SYSTEM

[75] Inventor: Abraham Janssens, Breda, Netherlands

[73] Assignee: U.S. Philips Corporation, New York, N.Y.

[21] Appl. No.: 788,107

[22] Filed: Nov. 4, 1991

[30] Foreign Application Priority Data

Nov. 5, 1990 [NL] Netherlands ............... 9002401

[51] Int. Cl.⁵ ............................................. H04J 3/16
[52] U.S. Cl. ............................ 370/82; 370/95.1; 370/105.1; 381/80
[58] Field of Search ............ 381/77, 80, 81; 370/77, 370/79, 80, 82, 95.1, 99, 105.1

[56] References Cited

U.S. PATENT DOCUMENTS

| | | | |
|---|---|---|---|
| 4,891,804 | 1/1990 | Lake | 370/99 |
| 4,947,451 | 8/1990 | Nawata | 370/95.1 |
| 4,991,207 | 2/1991 | Shiraishi et al. | 381/77 |
| 4,998,245 | 3/1991 | Tanaka et al. | 370/95.1 |

FOREIGN PATENT DOCUMENTS

3412418  10/1985  Fed. Rep. of Germany .

OTHER PUBLICATIONS

Isaac Kong et al., "CableNet: A Local Area Network, Reservation Scheme", IEEE Computer Society Intern Conference, Feb. 22, 1982, pp. 182–186.
Isaac Kong, "CableNet: A Local Area Network", IEEE International Conference on Communications, Session 6C.2, vol. 3/3, Jun. 13, 1982, pp. 1–5.

Primary Examiner—Benedict V. Safourek
Attorney, Agent, or Firm—Anne E. Barschall

[57] ABSTRACT

A communication system comprises a central processing unit (1) and a plurality of N communication stations (2.1, 2.2, ..., 2N), in which the central processing unit and the communication stations are coupled over an uplink signal line (3) and a downlink signal line (4). The downlink signal (FIG. 3) on the downlink signal line has the form of successive frames, each frame comprising M signal blocks ($SB_m$), the first signal block in a frame comprising a synchronizing word (sync word) (22), the signal blocks all having space for storing audio information in the form of p audio words (21), the M−1 signal blocks not comprising a sync word further having space for storing control information, the control information in a signal block belonging to a communication station containing downlink assign information (a.dl+m) denoting which audio words in the signal blocks in a frame are destined for said communication station. The uplink signal (FIG. 4) has the form of successive frames having a time duration equal to the time duration of the frames in the downlink signal. Each frame has space for first signal blocks (30) each comprising two or more audio words, and second signal blocks (31) comprising control information. The control information in the downlink signal and destined for a station further includes uplink assign information (audio chan. upl+m) denoting what first signal blocks in a frame in the uplink signal originate from a station. Furthermore, there are gaps (36A) between the uplink signal blocks originating from different stations.

25 Claims, 8 Drawing Sheets

COMMUNICATION SYSTEM AND A CENTRAL PROCESSING UNIT AS WELL AS A COMMUNICATION STATION IN THE COMMUNICATION SYSTEM

BACKGROUND OF THE INVENTION

1. Field of the Invention

The invention relates to a communication system comprising a central processing unit and a number of N communication stations (N≧2), in which the central processing unit and the communication stations are coupled and the central processing unit is arranged for generating a downlink signal for information transmission from the central processing unit to the stations and the central processing unit is arranged for receiving an uplink signal for information transmission from the stations to the central processing unit, and relates to a central processing unit and a communication station to be used in the communication system.

2. Description of the Related Art

The communication system of the type mentioned in the preamble is known from German Patent Specification 34 12 418 and is used in that document in a congress system in which the speech given by a speaker can simultaneously be translated by interpreters into one or more different languages, so that participants not having a command of the speaker's language are still able to follow the speech in a language familiar to them.

The prior-art communication system has the disadvantage of requiring many connecting cables rendering the installation very expensive. It is already known to realise a communication system by sending signals of different channels in the time or frequency-division multiplex mode through a restricted number of cables.

SUMMARY OF THE INVENTION

It is an object of the invention to provide a communication system in which the signal components of the downlink signal and the signal components of the uplink signal are transmitted in a time-division multiplex mode over a maximum of two connecting lines, that is to say, a downlink and an uplink between the central processing unit and the stations.

It is possible that the downlink signal and the uplink signal are modulated to different frequency ranges so that both signals are transmitted in a frequency-modulation mode over a single link. The communication system according to the invention is characterized in that the downlink signal has the form of successive frames, each frame having space for accommodating M signal blocks. The first signal block in a frame comprises a synchronizing (sync) word. The signal blocks all having space for accommodating audio information in the form of p audio words per signal block. The M−1 signal blocks which do not include a sync word have further space for accommodating control information. The control information belonging to a communication station and accommodated in a signal block include downlink assign information denoting which audio words of the p audio words in the signal blocks in a frame are destined for said communication station. The uplink signal has the form of successive frames, each frame having a time duration substantially equal to the time duration of the frames in the downlink signal. Each frame has space for accommodating first signal blocks, each first signal block having space for accommodating a number of audio words greater than one, and second signal blocks each having space for accommodating control information. The control information in the signal block in the downlink signal further includes uplink assign information denoting which first signal block(s) in a frame in the uplink signal is (are) coming from said communication station. Signal blocks in the uplink signal coming from different communication stations are separated by gaps not containing any information.

This achieves a communication system which comprises formats for the downlink and uplink signals so that they are unequal. This is necessary in view of the specific structure of the communication system. The central processing unit is the central point from which the downlink signal including the synchronization for the entire system is transmitted. The different information words may thus be included in the serial data stream of the downlink signal directly after each other. The uplink signal, however, is formed from contributions from the different stations which are generally arranged at mutually different spacings from the central processing unit. Therefore, when determining the format of the uplink signal, the mutually different delays of the signals from the stations to the central processing unit are to be taken into consideration. In addition, these differences are to be taken into consideration because of the fact that the uplink signal is synchronized with the sync words in the downlink signal.

In fact, this means that there should always be gaps in the uplink signal between the contributions from the different stations, so as to avoid overlapping contributions from stations to the uplink signal.

In order not to have too much overhead due to the gaps, the information words added to the uplink signal by a station are combined into signal blocks as much as possible, each signal block then containing two or more information words. Furthermore, it is a characteristic feature that the assign information for a station is only found in the downlink signal.

The communication system may further be characterized in that the signal blocks in the downlink signal each have space for accommodating r data words. The downlink assign information further denotes which data words of the r data words in the signal blocks in a frame are destined for said communication station. Each frame in the uplink signal further has space for accommodating third signal blocks. Each third signal block has space for accommodating a number of data words greater than one. The uplink assign information further contains information denoting which third signal block(s) in a frame in the uplink signal is (are) coming from said communication station. The signal processing of the data words is thus analogous to the signal processing of the audio words.

For initially connecting a communication station to the communication system, the communication system may further be characterized in that each frame in the uplink signal comprises a time slot which can include a communication station's initialize signal during an initializing phase of a communication station to be initialized, whereas the time duration of the time slot exceeds that of the initialize signal. A first signal block in a frame in the downlink signal in said initializing phase may further contain time equalization information and address information, while the address information is intended for the communication station to be initialized and denotes the communication station for which the time equalization information is destined. In this fashion an initial time equalization may be obtained so that the station is capable of inserting the information in the uplink signal at the right instant, that is to say, at the right position of a frame in the uplink signal.

The communication system may further be characterized in that an initialize signal in lieu of the control information may be included in the second signal block coming from a communication station in a frame in the uplink signal, and the control information in a signal block in the downlink signal belonging to a communication station comprises time shift information for this communication station, which time shift information is intended to correct the time equalization information. This may additionally provide a dynamic time equalization during the normal operation of the communication system. Such a dynamic time equalization may appear to be necessary because the delays for the uplink signals may change as a function of temperature variations.

The central processing unit to be used in the communication system according to the invention, arranged for receiving the uplink signal and for generating the downlink signal is characterized in that the central processing unit is arranged for generating the downlink signal in the form of successive frames. Each frame has space for accommodating M signal blocks. The first signal block in a frame includes a synchronizing word. All the signal blocks have space for accommodating audio information in the form of p audio words per signal block. The M−1 signal blocks which do not include a sync word have further space for accommodating control information. The control information associated to a communication station and present in a signal block contains downlink assign information and uplink assign information. The downlink assign information denotes which of the p audio words in the signal blocks in a frame are destined for a communication station. The central processing unit is arranged for receiving the uplink signal in the form of successive frames each having a time duration substantially equal to the time duration of the frames in the downlink signal. Each frame has space for accommodating first signal blocks, each first signal block having space for accommodating a number of audio words greater than one, and second signal blocks, each second signal block having space for accommodating control information. The uplink assign information in the downlink signal belonging to a communication station denotes which first signal block(s) of a frame in the uplink signal is (are) coming from this communication station. The central processing unit is arranged for extracting the first signal blocks in a frame coming from a first communication station from at least one substantially fixed position in the successive frames in the uplink signal. The fixed position(s) of the first signal block(s) in a frame in the uplink signal are related to the uplink assign information belonging to this first communication station. For applying the audio words of the first signal blocks coming from said first communication station to a second communication station, the central processing unit is arranged for inserting each time a successive audio word at least at one fixed position into the successive signal blocks of a frame in the downlink signal. The fixed position(s) of the audio word(s) in a signal block in the downlink signal are related to the downlink assign information for said second communication station.

Thus, the central processing unit generates both the uplink assign information and the downlink assign information and applies this information to the stations by means of the downlink signal. In a simultaneous translation system the following may occur. A user of a communication station, by depressing one or more buttons on the station, indicates which language he wishes to listen to from the communication station. By means of the control information in the uplink signal the central processing unit is informed of the wish of the user of the station. The central processing unit then generates the downlink assign information in the downlink signal and thus assigns to the station a specific channel on which the language concerned is present. The station extracts the downlink assign information from the downlink signal and stores the information in the station.

Another example is the use of the communication system as an intercom. In this case a user of a first station will indicate, by depressing buttons on the station, that he wishes to communicate with a second station. The central processing unit detects the depressed buttons and then assigns an audio channel to the first station by means of the uplink assign information, over which channel the first station can transmit audio information to the central processing unit. In addition, the central processing unit assigns an audio channel to the second station by means of downlink assign information, over which channel the audio information from the central processing unit can be transmitted to the second station.

The central processing unit may further be characterized in that for data word supply from the central processing unit to the second communication station the central processing unit is arranged for inserting each time a successive data word at least at one fixed position in the successive signal blocks in a frame in the downlink signal. The central processing unit is also arranged for generating downlink assign information denoting which data words of the data words in the signal blocks of the frame are destined for the second communication station. The fixed position(s) of the data word(s) in a signal block are related to said downlink assign information for the second communication station. For transmitting data words from the first communication station to the central processing unit the central processing unit is arranged for generating uplink assign information belonging to said first communication station. The assign information further denotes which third signal block, containing a number of data words greater than one, in a frame in the uplink signal is coming from this first communication station. The central processing unit is also arranged for extracting the third signal block coming from said first communication station from a frame in the uplink signal in correspondence with the uplink assign information. The data word processing in the central processing unit is thus analogous to the audio word processing in the central processing unit.

To initialize a communication station the central processing unit may be arranged for generating and inserting in the downlink signal an initialize start signal for subsequently detecting an initialize signal in the time slot of a frame in the uplink signal, and for detecting the instant at which the initialize signal is received relative to the instant at which the initialize start signal is transmitted. The central processing unit is arranged for calculating therefrom time equalization information, which time equalization information is related to the distance of the uplink signal transmission path between the central processing unit and said communication station, and is arranged for inserting an assign signal, address information and said time equalization information in a first signal block in a frame in the downlink signal. In this fashion the processing unit can incorporate a new communication station in the system, assign an address to the station and apply time equalization information to the station so that the communication station is capable of extracting the information destined for the station itself from the downlink signal and inserting the information destined for the central processing unit in the uplink signal at the right instant.

The central processing unit may further be characterized in that the central processing unit is arranged for detecting the initialize signal in said second signal block in the uplink signal, is arranged for detecting the instant at which the initialize signal is received, and is arranged for generating a control signal as a function of the difference between the actual receive instant of the initialize signal and a desired receive instant of the initialize signal. The central processing unit is arranged for generating a control signal as a function of this difference and is arranged for including time shift information in the control information belonging to said communication station in a signal block in the downlink signal, which time shift information corresponds to said control signal. In this manner the dynamic time equalization during normal operation of the system is possible.

The communication station which can be used in the communication system according to the invention is characterized in that the communication station is arranged for receiving the downlink signal, is arranged for extracting the control information belonging to said communication station and included in a signal block in the downlink signal, for extracting from the control information the downlink assign information and the uplink assign information for said communication station, for extracting an audio word from at least one fixed position in the successive signal blocks of a frame in the downlink signal, said fixed position(s) of the audio word(s) in a signal block being related to the downlink assign information for said communication station, the communication station further being arranged for supplying at least one first signal block containing audio words and a second signal block containing control information at substantially fixed positions in a frame in the uplink signal, said fixed position(s) for the first signal block(s) of the communication station being related to the uplink assign information for said communication station. An active station is concerned here, which is capable of inserting information at the right position in a frame in the uplink signal via the uplink assign information for the inserted information to be transported to the central processing unit, as well as extracting from the downlink signal the information destined for the station via the downlink assign information.

The communication station may further be characterized in that for sending data words from the communication station to the central processing unit the communication station is arranged for inserting a third signal block containing data words in the uplink signal at a position in a frame in the uplink signal. The position for the third signal block of the communication station in the frame is related to the uplink assign information for said communication station. For sending data words from the central processing unit to the communication station, the communication station is arranged for extracting each time a successive data word from at least one fixed position in the successive signal block in a frame in the downlink signal. The fixed position of a data word in a signal block is related to said downlink information for said communication station. Consequently, the data words are processed in like fashion as the audio words.

For initializing the communication station in the system, the station is characterized in that for initializing the communication station this station is arranged for detecting an initialize start signal in the downlink signal. For subsequently generating an initialize signal and inserting the initialize signal in the uplink signal at an instant so that the initialize signal is located in the time slot of a frame in the uplink signal, the station is arranged for detecting an assign signal, address information and said time equalization information in a first signal block in a frame in the downlink signal. The communication station is arranged for inserting the first and second signal blocks in the uplink signal in response to the time equalization information at an instant so that the first and second signal blocks of the uplink signal inserted in the uplink signal by the communication station are separated from uplink signal blocks supplied by different communication stations by gaps not containing any information. The communication station is arranged for inserting the third signal blocks in the uplink signal in response to the time equalization information at an instant so that the third signal blocks in the uplink signal inserted in the uplink signal by the communication station are separated from uplink signal blocks supplied by different communication stations by gaps not containing any information. In this manner the initializing phase for the station is realised.

The station may further be characterized in that the communication station is further arranged for accommodating the initialize signal in lieu of the control information in the second signal block coming from the communication station in a frame in the uplink signal, if the control information of said communication station has not changed during one or more previous frames. The communication station is arranged for detecting the time shift information in the control information belonging to the communication station in a signal block in the downlink signal, and for advancing or just delaying the instant at which the first and second signal blocks are inserted in the uplink signal in response to the time shift information. The communication station is arranged for advancing or just delaying the instant at which the third signal blocks are inserted in the uplink signal in response to the time shift information. This enables the station to realise the dynamic time equalization.

Passive communication stations are communication stations that are unable to supply information to the central processing unit over the uplink, or active stations that have not received any uplink assign information from the central processing unit.

Such passive communication stations have the same characteristic features according to the invention as the active communication stations, but only as regards the downlink part of such a station.

BRIEF DESCRIPTION OF THE DRAWING

The invention will be further explained in the following descriptions of the drawing Figures with reference to a number of embodiments, in which.

DETAILED DESCRIPTION OF THE PREFERRED EMBODIMENTS

Communication System

Figure 1:
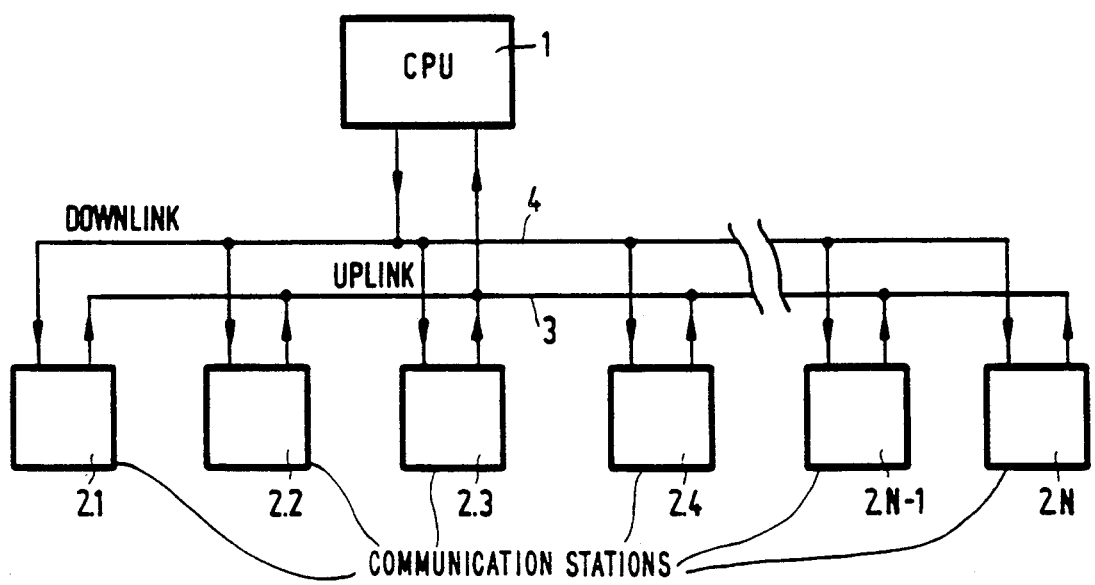
FIG. 1 shows a block diagram of an embodiment of the communication system.
Figure 3:
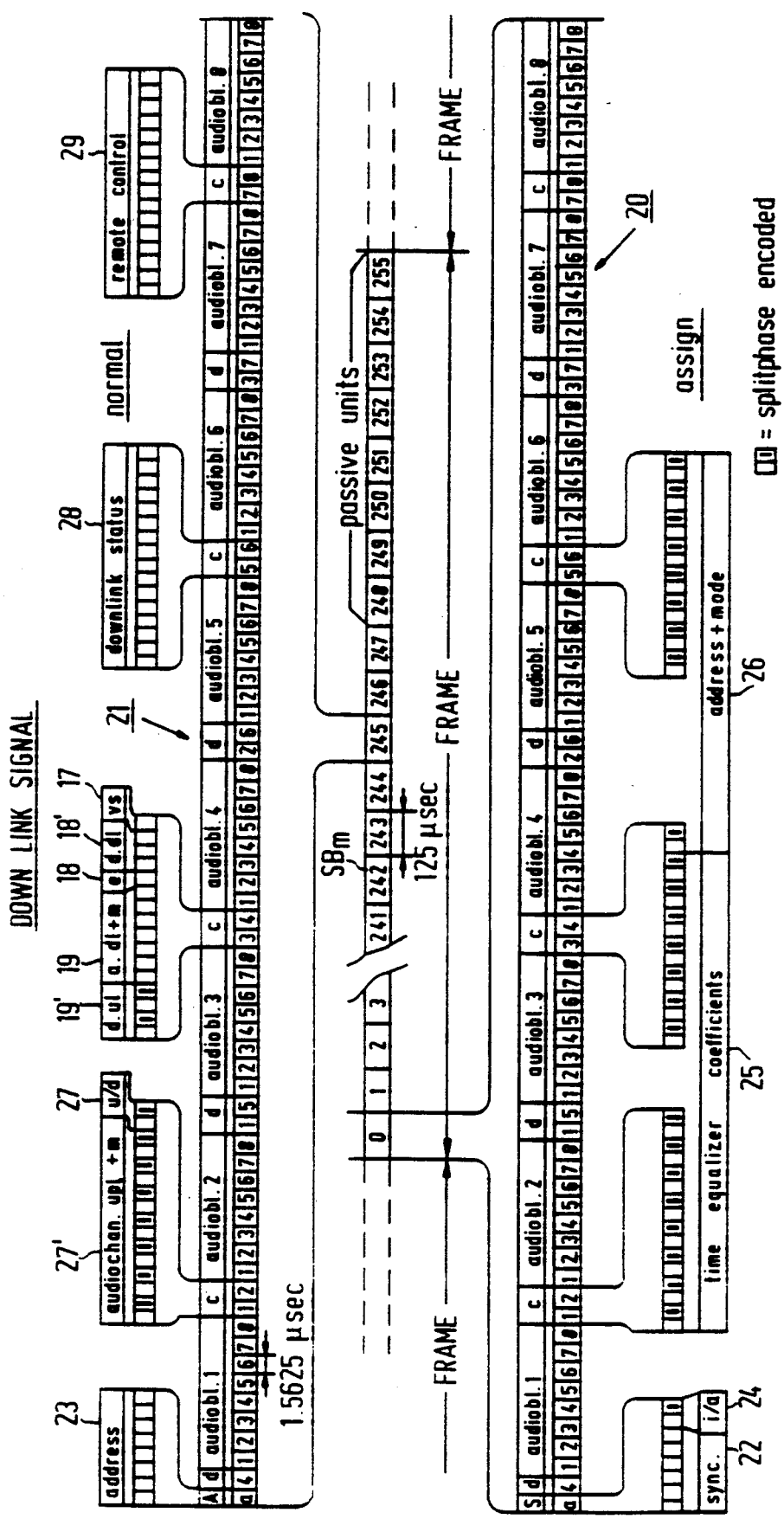
FIG. 3 shows a signal format of the downlink signal.

FIG. 1 shows a block diagram of the communication system according to the invention. It is a digital audio communication system as could be used, for example, in congress systems. The communication system comprises a central processing unit 1 and N communication stations 2.1, 2.2, ..., 2.N. The central processing unit 1 is coupled to the communication stations 2.1 to 2.N via an uplink 3 and a downlink 4. For sending information from the central processing unit 1 to the stations 2.1 to 2.N the processing unit 1 generates a downlink signal which, after encoding in the processing unit 1, for example in a Miller coder, can be sent to the stations via the downlink 4. In the stations the coded downlink signal is decoded and the stations can capture the information relevant to each of them from the downlink signal. The format of the downlink signal prior to encoding is represented in FIG. 3.

Figure 4:
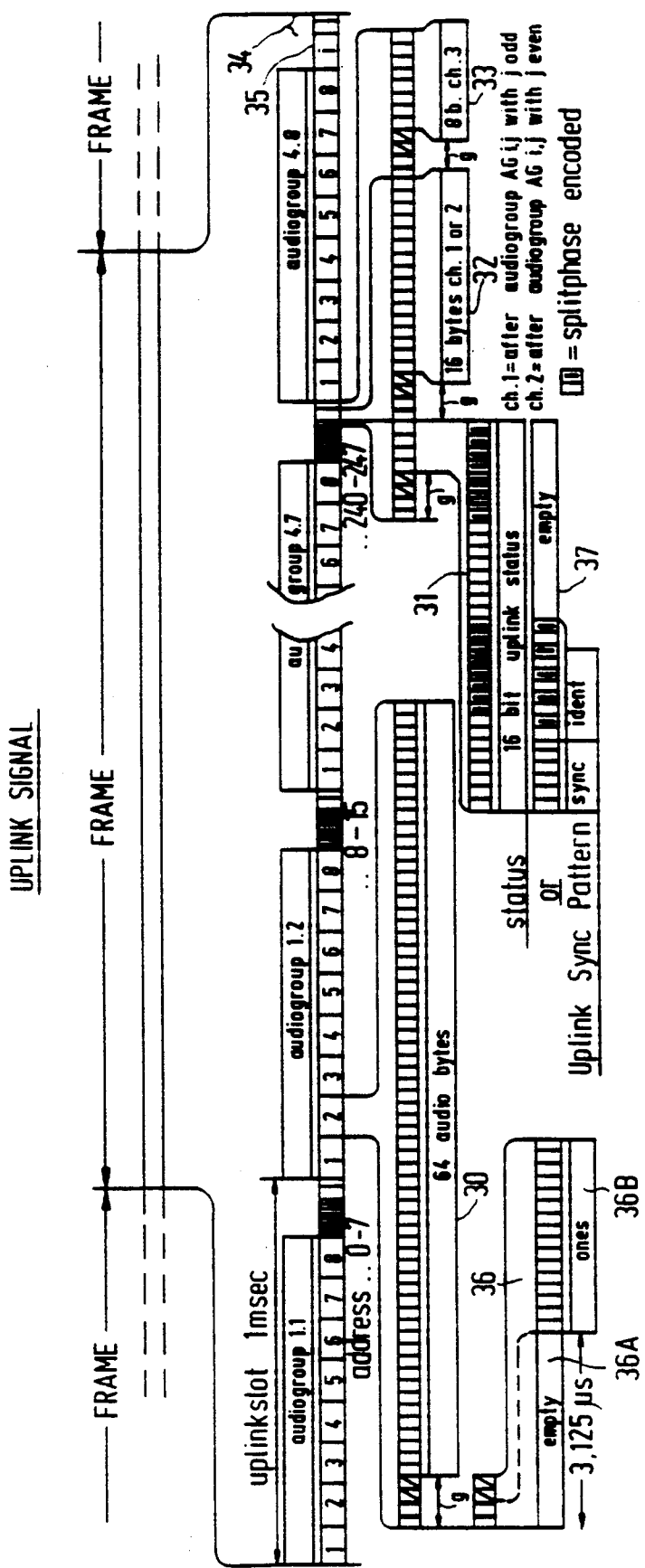
FIG. 4 shows the signal format of the uplink signal.

Information of the stations and destined for the central processing unit 1 is sent to that unit over the uplink 3 in the form of an uplink signal coded in a Miller coder, at which unit the coded uplink signal is decoded and further processed. The format of the uplink signal subsequent to decoding is represented in FIG. 4.

The uplink 3 and the downlink 4 may each be separate electric lines over which the coded uplink and downlink signals can be transported. Alternatively, however, it is possible for the link between the central processing unit 1 and the stations 2.1 to 2.N to be realised over a single electric line, for example, a coax cable, in which the uplink and downlink signals are modulated to different frequency ranges to an uplink channel and a downlink channel on the electric line.

Figure 2:
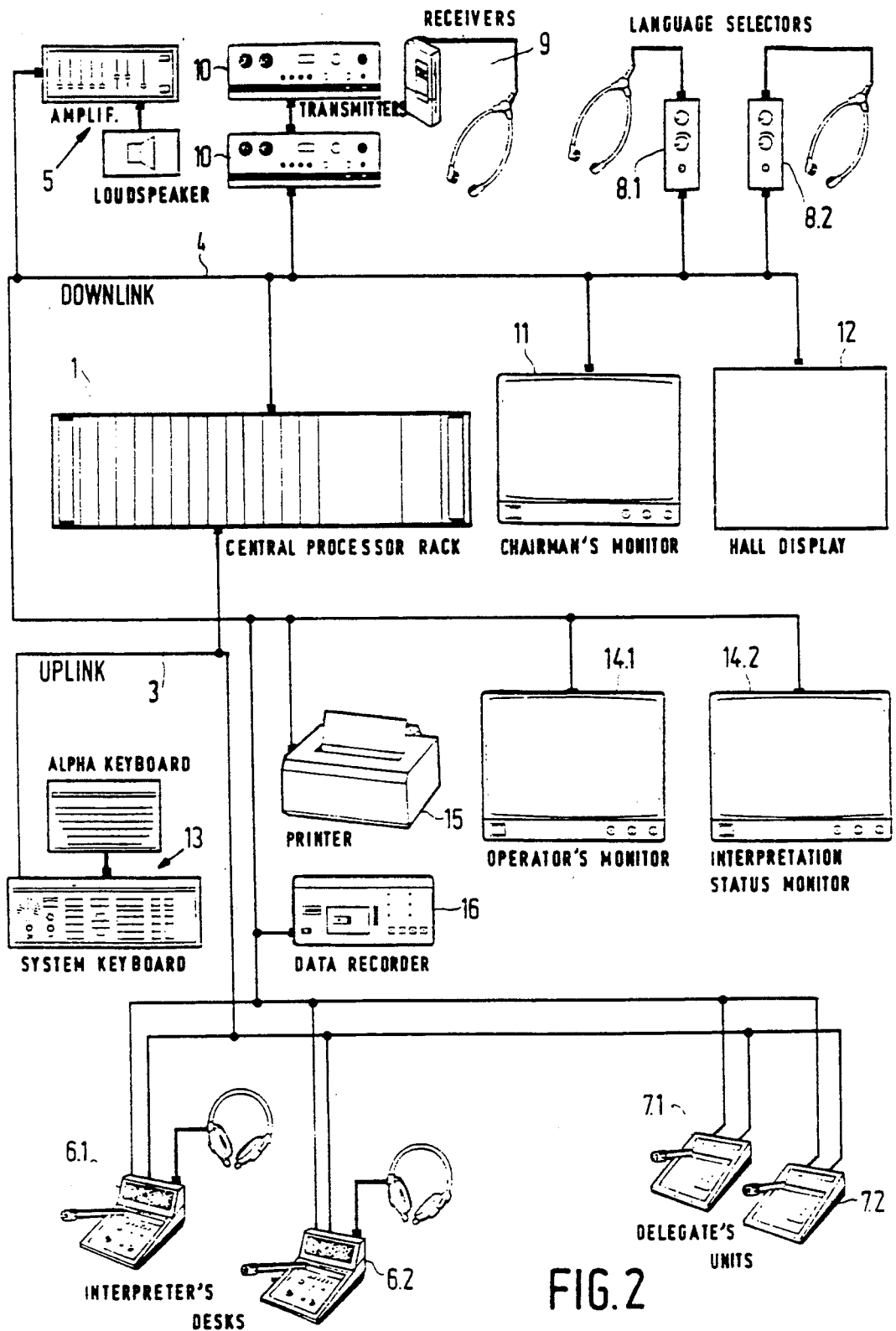
FIG. 2 gives a further elaboration of the communication system.

FIG. 2 shows an application of the communication system according to the invention to a congress system. Delegates are in the congress hall in which sound reproducing equipment 5 including amplifiers and loudspeakers is arranged to amplify the speaker's speech in the hall. Delegates who do not have a command of the speaker's language may use a simultaneous translation of the speech provided by interpreters. For this purpose, interpreters are accommodated in separate spaces comprise communication stations 6.1, 6.2, ..., etc., each interpreter having headphones for receiving the spoken words and a microphone for their simultaneous interpretation to be recorded.

The delegates may also have the disposal of communication stations 7.1, 7.2, ..., etc. with which they can address the meeting after a request for a permission to speak made by depressing a button on such a station and after a permission given by the chairman of the meeting which may be visualized by means of a flashing LED on the station. The communication stations may comprise badge readers so that it is also possible to have the delegates vote by means of the communication stations 7.

The delegates may also have the disposal of a communication station in the form of only a receiver, such as the receivers 8.1, 8.2, ..., etc. electrically coupled to the downlink 4, or such as infrared receivers 9. To this end one or more infrared transmitters 10 are coupled to the downlink.

The chairman of the meeting has the disposal of a communication station 7 which presents a few more facilities and, in addition, comprises a monitor 11. By means of his communication station the chairman may also indicate whether a delegate and if so which delegate is allowed to interrupt. Furthermore, a display 12 which may display results of votes, messages or other information may further be installed in the congress hall. Alternatively, it is possible for the communication system to be operated by a system operator. The communication station for the system operator may comprise a unit 7 which also presents more options and further includes a keyboard unit 13, a monitor unit (14.1, 14.2) on which the control information for the system operator can be displayed. In addition, the communication station of the system operator may further comprise a printer 15 and a data recorder 16. For example, all speeches can be recorded on the data recorder 16 and the printer 15 may be used for printing the results of a vote.

FIG. 2 shows that communication stations intended for bidirectional information transmission, i.e. from the processing unit 1 to a station and vice versa, are coupled both to the uplink 3 and the downlink 4. Some communication stations, such as communication stations 8 and 9 are passive stations. They only receive information from the central processing unit 1 and are coupled only to the downlink 4.

Downlink Signal Format

FIG. 3 shows the format of the uncoded downlink signal as it is generated by the central processing unit. The downlink signal is constituted by successive frames of a certain length, in the present example 32 ms long. Each frame comprises M signal blocks. The signal blocks in this example are numbered 0 to 255, that is to say, M=256. Each signal block is thus 125 μs long. In the example shown in FIG. 3 a signal block comprises 80 bytes of information. One byte is 8 bits long and lasts, for example, 1.5625 μs. The first signal block denoted by reference numeral 20, contains a sync word. The synchronizing of the whole communication system is effected by means of the sync word in the downlink signal. (Also the synchronization of the uplink signal to be discussed hereinafter is effected by means of the downlink synchronization). The sync word comprises the first six bits of the signal block 20 referenced "sync" 22. The other signal blocks, one of which is denoted by the reference numeral 21, all contain an address word. They are the first eight bits of the signal block 21 referenced "address" 23. The address word is related to at least one of the stations 2.1 to 2.N. However, it should be observed at this point that these addresses are not absolutely necessary, but that the stations may extract the information destined for them from the downlink signal also differently from detecting and recognizing the addresses.

All signal blocks have space for p audio words per signal block. An audio word in its turn comprises one byte of 8 bits. Each (16-bit) audio sample is in fact coded to one or two 8-bit audio words, depending on whether data reduction is used or not. In the example shown in FIG. 2 the signal blocks comprise 64 audio words combined in eight audio blocks of eight audio words each. The audio blocks are referenced "audiobl. 1" to "audiobl. 8", and the audio words in an audio block are in turn numbered 1 to 8.

The signal blocks, such as the signal blocks 20 and 21, have space for control information. This control information is included in the control signal blocks referenced c which are situated between the audio blocks 1 and 2, 3 and 4, 5 and 6, 7 and 8. In this example 8 bytes of 8 bits each are available in aggregate for the control information. The bytes are numbered 1 to 8.

Furthermore, the signal blocks each have space for seven data words. The data words are referenced "d" and are each in the form of one 8-bit-long byte. The data words are numbered 1 to 7. The control information in the signal blocks which do not contain a sync word, which are thus all the signal blocks 21 in a frame except for the first signal block 20, has the following connotation.

The control bytes 1 and 2 between the audio blocks 1 and 2 in FIG. 3 feature the audio channel uplink+mode code, shortened in FIG. 3 to "audiochan. upl+m" and denoted by the reference numeral 27' and an up/down code, shortened to "u/d" and denoted by the reference numeral 27. For the "audiochan. upl+m" code there are 14 bits available and 2 bits for the "u/d" code. The connotation of the codes will be explained hereinafter. The control bytes 3 and 4 between the audio blocks 3 and 4 in FIG. 3 feature the data uplink code, shortened to "d.ul" and denoted by reference numeral 19', for which four bits are available, the audio downlink-+mode code, shortened to "a.dl+m" and denoted by reference numeral 19, for which 7 bits are available, an enable code, shortened to "e" and denoted by reference numeral 18, for which one bit is available, a data downlink code, shortened to "d.dl" and denoted by reference numeral 18', for which three bits are available, and a voice switch code, shortened to "vs" and denoted by reference numeral 17 for which one bit is available. The control bytes 5 and 6 between the audio blocks 5 and 6 indicate the "downlink status" denoted by reference numeral 28, for which 16 bits are available. The control bytes 7 and 8 between the audio blocks 7 and 8 provide the "remote control" information, denoted by reference numeral 29, for which also 16 bytes are available.

The control information in the control bytes 1 to 8 in a signal block 21 belongs to the address word of the first byte in the signal block. Because the address word belongs to a station, this implies that the control information in this signal block 21 belongs to (or is destined for) the communication station in question. If the communication station recognizes its assigned address in the serial data stream of the downlink signal, the station knows that the control bytes in the signal block having that particular address are destined for the station which will then extract this control information from the downlink signal.

The "a.dl+m" code 19 indicates to the communication station which audio words from the maximum of 64 audio words in a signal block 64 are destined for this station.

If the "a.dl+m" code indicates that only a single audio word per signal block is destined for this station, the communication station will extract that single audio word, for example, the audio word 3 from the audio block 5 of all the signal blocks. Because the signal blocks are each 125 μs long, this implies an 8 kHz sample rate. At the 8 kHz sample rate the maximum number of audio channels in the downlink signal is equal to 64. Thus, a maximum of 64 communication stations can be supplied with an audio signal which is different from any other communication station. In that case each of the 64 stations thus extracts only a single audio word from the 64 audio words of the successive signal blocks.

Alternatively, it is possible to supply a communication station with a higher quality audio signal. This is also denoted by the "a.dl+m" code 19. A communication station could be supplied with an audio signal at a sample rate of 16 kHz. In that case the communication station extracts pairs of audio words from all the signal blocks, for example, the first audio word from the first and fifth audio blocks. In that case a maximum of only 32 audio channels is possible at a sample rate of 16 kHz for all the channels. The minimum number of channels in the downlink signal is, for example, 8 at a sample rate of 64 kHz. In that case a communication station each time selects the same word from all the audio blocks in the signal blocks. In this case the audio channels may be employed for other purposes, for example, for applications requiring a higher bit rate. In this context one may think of transmitting stereo hifi signals or still images to a station which, in the latter case, is to comprise a monitor.

The "d.dl" code 18' denotes to a communication station which data word from the maximum of seven data words in a signal block in the downlink signal is destined for the station. The three-bit "d.dl" code 18' may thus denote one of the 7 data channels in the downlink signal. Once a data channel has been denoted, the communication station extracts the same data word from each signal block. One three-bit word is left for the "d.dl" code. This code is intended for denoting that no data information is assigned to the communication station.

Each data channel has a capacity of 8 kbyte/s, i.e. 64 kbit/s. Thus, the system fulfills the bit rate standard laid down in the ISDN standard s that the system can be connected to an ISDN network. The "a.dl+m" code 19 together with the "d.dl" code 18' forms the downlink assign information in a signal block.

The enable bit 18 denotes whether the communication station is entitled or not to hear the assigned audio channel in the downlink signal.

The voice switch code 17 denotes whether the communication station is switched or not to the voice switch mode. If the communication station is not switched to the voice switch mode, the person making use of that station and wishing to say something through the microphone of that station will have to request the central processing unit, by depressing a button on that station, to provide an audio channel in the uplink signal for that station. If the communication station has adopted the voice switch mode, the central processing unit will detect whether the microphone of the communication station is spoken into and will automatically assign an audio channel in the uplink signal to the communication station the moment the microphone signal meets a certain requirement, for example, the sound level surpasses a certain threshold. The "downlink status" code 28 denotes to a communication station, for example, which lights on the station are to be switched on or off. The "remote control" code 29 is intended for management functions and intended for controlling external functions.

The connotation of the "audiochan. upl+m" code 27', the "d.ul" code 19' and the "u/d" code 27 will be explained hereinafter.

The first signal block 20 in the downlink signal also comprises the 64 audio words, the 7 data words and the 8 control words. In addition, the first word in the signal block comprises a 6-bit sync word 22 and two more bits representing a "i/a" code 24, the "i" standing for "initialize mode" and "a" for "assign mode". The control information words 1,2; 3,4 and 5,6 in the first signal block 20 in the assign mode comprise time equalization information 25, address information and mode information 26. The time equalization information is represented in the form of time equalizer coefficients for which 30 bits are available. 18 more bits are available for address and mode information. The two control information words 7,8 between the audio blocks 7 and 8 do not contain any information and are thus empty.

The "i/a" code 24, the "time equalizer coefficients" 25 and the "address+mode" information 26 will also be explained hereinafter.

Finally, it should be observed that the control information in a number of signal blocks 21 in a frame, i.e. the signal blocks referenced 248 to 255 in FIG. 3, are intended for passive communication stations. This means that they are only capable of receiving information from the central processing unit 1 via the downlink signal, but cannot themselves supply information to the central processing unit via the uplink signal. Passive communication stations may be, for example, the stations 8 and 9 in FIG. 2.

Uplink Signal Format

FIG. 4 shows the format of the uncoded uplink signal received by the central processing unit 1. The uplink signal comprises successive frames having the same length as the frames in the downlink signal. The frames in the present example are thus 32 ms long.

In contrast with the downlink signal, generated by the central processing unit, i.e. from a single point, the uplink signal is generated by the communication stations together. This is to say, that each station produces part of the total data stream of the uplink signal, and that each station is to provide its own contribution to the total data stream of the uplink signal at the proper moment, so that the contributions to the uplink signal from the individual stations do not overlap in time.

The format of the uplink signal is therefore as follows. Each frame comprises first signal blocks. A first signal block is referenced 30 and has space for q audio words. In the example shown in FIG. 4 q is equal to 64. The first signal blocks are combined to groups of 8 signal blocks. One frame has a space for a total of 32 groups of 8 first signal blocks. There are eight audio groups, referenced AG 1.1 to AG 1.8, then eight audio groups, referenced AG 2.1 to AG 2.8, then eight audio groups referenced AG 3.1 to AG 3.8 and, finally, eight audio groups referenced AG 4.1 to AG 4.8.

Each frame has further space for second signal blocks. A second signal block has the reference numeral 31. The second signal blocks comprise control information. The second signal blocks are 32 bits long. The second signal blocks are combined to groups of 8 signal blocks. In aggregate, a frame has space for 31 groups of 8 second signal blocks. A group of 8 second signal blocks is embedded between two groups of first signal blocks. Each frame additionally has space for third signal blocks. Two third signal blocks are denoted by reference numerals 32 and 33. The third signal blocks contain data words. FIG. 4 shows that the third signal block 32 has 16 data words and the third signal block 33 has 8 data words, each data word again comprising 8 bits. The third signal blocks are combined to pairs, that is to say, a third signal block 32 and a third signal block 33. In aggregate there is space for 32 groups of third signal blocks. For 31 of these third signal blocks it holds that a pair of third signal blocks is embedded between a group of 8 second signal blocks and a group of 8 first signal blocks. The latter group, referenced 34, is found at the end of the frame. Each frame further includes an initialize time slot 35 referenced "i". This time slot 35 has a length of 0.1 ms. The purpose of this time slot 35 will become apparent hereinafter.

Furthermore, there are time slots referenced "g" between all the signal blocks. The contents of a time slot "g" are referenced 36. The time slot 36 has a void 36A referenced "empty", having a nominal length of 3μs, and then 16 bits which are all logic "1".

Just like the downlink signal, the uplink signal can have a minimum of 8 and a maximum of 64 audio channels.

A maximum of 64 audio channels in the downlink signal meant that in each frame in the downlink signal 256 audio words were destined for a communication station, and a minimum of 8 channels meant that for each frame in the downlink signal $8 \times 256 = 2.048$ words were destined for a communication station. In the uplink signal with the maximum number of 64 audio channels a communication station will thus have to insert 256 audio words per frame in the uplink signal and, with a minimum number of 8 channels a communication station will thus have to insert 2.048 words per frame in the uplink signal.

Figure 5:
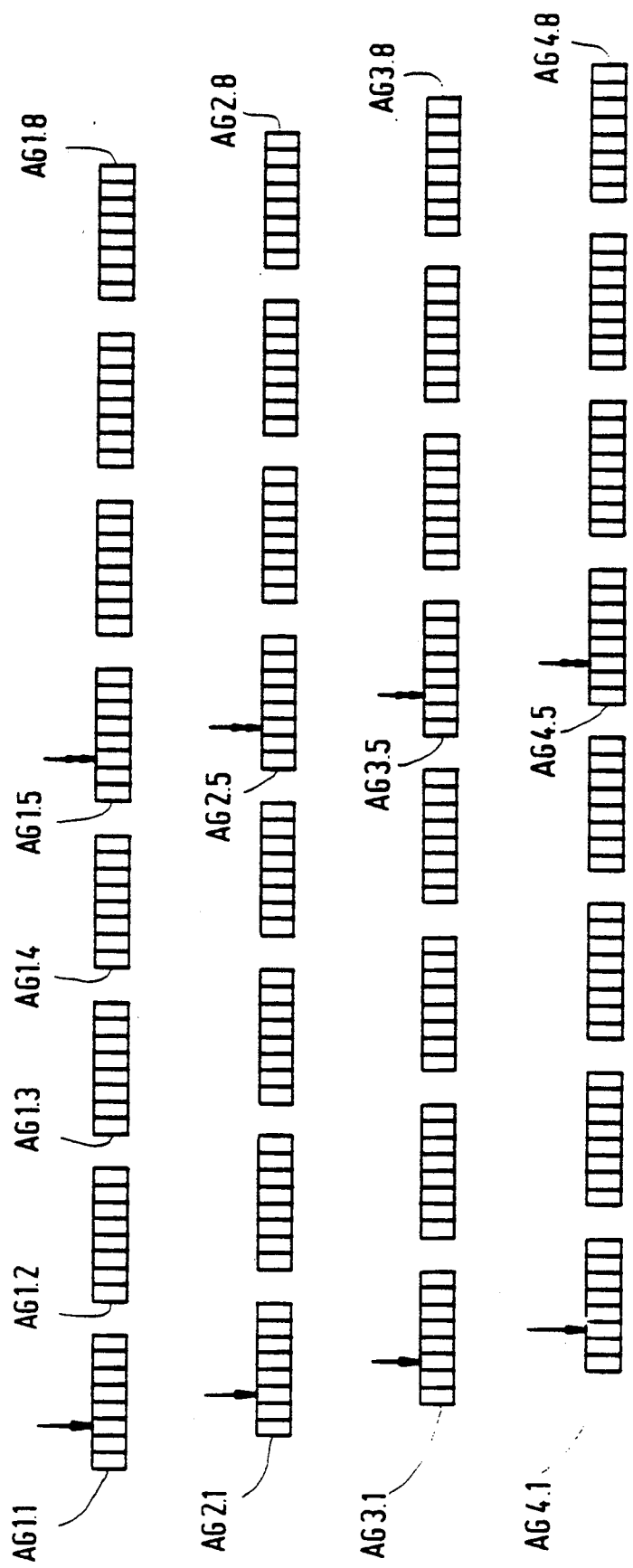
FIG. 5 gives a further explanation of the contents of the audio blocks in a frame in the uplink signal.

FIG. 5 shows which first signal blocks, to be termed audio blocks in the following, a station supplies to the uplink signal for the four different possibilities. Let us assume that a communication station supplies the third audio block in audio group AG 1.1 to the uplink signal. For supplying 256 audio words per frame to the uplink signal this means that the communication station also is to supply the third audio blocks to the audio groups AG 2.1, AG 3.1, AG 4.1 ($4 \times 64 = 256$). This is shown in FIG. 5 by means of single arrows. FIG. 5 shows all the audio blocks in one frame. A second audio channel could be formed, for example, by the audio words in the third audio blocks of the audio groups AG 1.5, AG 2.5, AG 3.5 and AG 4.5, inserted in the uplink signal by a second communication station. This is shown in FIG. 5 by means of the double arrows. FIG. 5 thus clarifies that in the uplink signal 64 audio channels are possible at a sample rate of 8 kHz=(256 samples/32 ms).

If a communication station were to insert 512 audio words per frame in the uplink signal, so as to realise an audio channel at a sample rate of 16 kHz, this communication station would insert, for example, the third audio blocks in the audio groups AG 1.1, AG 1.5, AG 2.1, AG 2.5, AG 3.1, AG 3.5, AG 4.1 and AG 4.5. If not more than 8 audio channels are present in the uplink signal, a communication station will insert, for example, the third audio blocks in each audio group of the frame, that is to say, a total of 32 audio blocks having 64 audio words each, that is 2.048 audio words per frame.

The "audiochan. upl+m" code 27' in the downlink signal may now be explained as being the code denoting which audio blocks in a frame in the uplink signal are to be filled by the destined communication station. Analogous to the "a.d.+m" code 19, it denotes the audio channel in the uplink signal destined for the communication station, including the sample rate for the audio information in that channel.

In response to which address has been assigned to a communication station by the central processing unit 1, one of the (8×31=248) second signal blocks in a frame is available for transporting the control information from the communication station to the central processing unit. This control information, referenced "uplink status" 31 in FIG. 3, for example, implies a depressed button.

Also the control signal denoting the level of the microphone signal of a communication station in the "voice-switch" mode is sent to the central processing unit 1 via this second signal block. The second signal block is 32 bits long, it is true, but in fact the second signal blocks comprise no more than 2 bytes. Each byte is included twice in the second signal block, once in normal notation and once in inverse notation. This is done for obtaining greater accuracy during signal transmission.

As observed before, each frame contains 248 second signal blocks. Because the system is intended for a maximum of 247 active communication stations (this corresponds to the number of signal blocks in the downlink signal containing control information for active communication stations, that is, 256 minus the number of passive stations (8) minus the first signal portion) this means that a second signal block, in this example the second signal block of the "zero" address, is empty.

Each frame in the uplink signal has space for 32 groups of two third signal blocks each for transmitting data words from the communication stations to the central processing unit 1. Actually, the uplink signal has space for three data channels. The data blocks 33 in all 32 groups comprise each 8 bytes (data words) of the data channel 3. The data blocks 32 in the groups comprise either 16 bytes (data words) of the data channel 1, or 16 bytes of the data channel 2. Depending on whether a group of third signal blocks succeeds an audio group AG i,j whose second index j is odd or even, the data block 32 comprises 16 data bytes of data channel 1 or 2 respectively. A total number of 32×8 data words per frame are transmitted per data channel from a communication station to the central processing unit 1. This narrows down also for the uplink signal to a bit rate of 64 kbit/s. The "d.ul" code 19' in the downlink signal now denotes, analogous to the "d.dl" code 18', whether a communication station has been assigned one of the three data channels in the uplink signal, and if so, which data channel.

The "d.ul" code 19' comprises four bits. In fact, they are two bits, that is to say, the first and the third bits. They may denote that a communication station having an address included in the first word in the same signal block of the "d.ul" code, is no longer assigned a data channel in the uplink signal: for example, the first and third bits are both "0"; is assigned the first data channel, for example, the first bit is "1" and the third bit is then "0"; is assigned the second data channel, for example, the first bit is "0" and the third bit "1"; or is assigned the third data channel, the first and third bits are both "1".

The second bit in the "d.ul" code 19' is the inverse of the first bit, and the fourth bit in the "d.ul" code is the inverse of the second bit. This also with the aim of obtaining a more reliable signal transmission from the central processing unit to the stations. Also for the "audiochan. upl+m" code 27' it holds that this code actually comprises 7 bits, just like the "a.dl+m" code 19. An even bit in the "audiochan. upl+m" code 27' is always the inverse of the immediately preceding bit. This is also done with the aim of obtaining a more accurate signal transmission. A correct detection of the "audiochan. upl+m" code 27' and the "d.ul" code 19' in the communication stations is of the utmost importance. When these codes are detected erroneously, this could lead to a communication station inserting its information in the uplink signal at a wrong instant during a frame time of 32 ms. In that case there is a great chance that this moment of insertion coincides with the moment another communication station wishes to insert its own information in the uplink signal. This would lead to a serious disturbance of the signal transmission from the stations to the central processing unit, which is highly undesirable.

Characteristic features in the uplink signal are:
(a) that a communication station inserts a number of audio words greater than one in the uplink signal in a first signal block in a frame assigned to the station. In the present example this is 64;
(b) that the communication station inserts a number of control information words (bytes) greater than one in the uplink signal in a second signal block in a frame assigned to the station;
(c) that the communication station inserts a number of data words greater than one in the uplink signal of a third signal block in a frame assigned to the station. In the present example this is 8 for the third signal block carrying the reference numeral 33, and 16 for the third signal block carrying the reference numeral 32;
(d) that there is always a time slot g between two successive signal blocks coming from different communication stations. This time slot g comprises, as observed before, a gap 36A which has a nominal length of 3.135 $\mu$s and does not contain any information, and comprises 16 logic ones, cf. the time slot g shown in FIG. 4 carrying the reference numeral 36.

This gap 36A is intended for enabling slight shifts in time from the moment a communication station supplies its information in the form of first, second and possibly third signal blocks to the uplink signal.

The 16 bits having the logic value "1", referenced 36B in FIG. 4, are intended to re-synchronize the timing in the central processing unit which might have been slightly shifted because of the lack of data in the gap 36A, with the incoming information in the uplink signal upon reception in the central processing unit 1, so that a correct detection of this information in the central processing unit will then be possible.

Temperature variations make it possible, for example, that the instant at which a communication station inserts its information in the uplink signal, could shift by more than the 3.125 $\mu$s of the gap 36A, so that an overlap of information transmitted by two different communication stations could yet occur in the uplink signal. In order to avoid this, a dynamic time equalization is used in the communication station. This dynamic time equalization will be explained hereinafter.

Initializing Phase

First the initializing phase for a communication station will be explained. In the initializing phase a communication station is initially included in the communication system. Thus, the central processing unit does not yet know (recognize) the communication station.

The "i/a" code 24 in the first data word of the first signal part of a frame comprises two bits, cf. FIG. 3. Actually, this is only a single bit, the first bit. The second bit is the inverse of the first bit, here too with the aim of achieving a higher reliability for the detection of the "i/a" code in a communication station.

In 8-frame recurrent cycles in the downlink signal the central processing unit 1 generates once an "i/a" code equal to, for example, logic "01", which stands for "initialization" and the other times "10" which stands for "assign".

A user of a communication station switching this communication station on for the first time, will depress the "initialize" button on the communication station. The communication station then detects an initialize code "01" transmitted once per 8 frames after the sync word in the downlink signal. In a reaction to the detection of the initialize code "01" the communication station sends out an initialize signal, for example, a data word in the form of a series of bits whose first part is equal to the sync word in the first signal portion of each frame in the downlink signal, and the second part an identification code followed by a gap, cf. the pattern referenced 37 in FIG. 4, and inserts this initialize signal in the uplink signal in the initialize time slot 35 of the uplink signal. Since the uplink signal and the downlink signal have first time and phase relations to each other, the communication station knows at which moment after the detection of a sync word in the downlink signal the initialize slot 35 in the uplink signal occurs.

Depending on the position of the communication station relative to the central processing unit, and the length of the link between them, the processing unit detects this initialize signal at a certain location in the initialize time slot 35.

This initialize time slot 35 lasts much longer than the initialize signal transmitted by the communication station. The central processing unit now knows the difference in time between the sync word generated by the unit itself and the instant at which the initialize signal in the initialize time slot 35 is received. The processing unit 1 can then compute at what distance the communication station is located relative to the unit.

The central processing unit 1 then assigns an address to the communication station and computes time equalizer coefficients for the communication station. After that, the "i/a" code 24 in the first signal portion in one or a plurality of successive frames becomes equal to logic "10", which introduces the assign mode. In addition, the processing unit 1 stores the time equalizer coefficients, the address and a mode code in the control bytes 1, 2, 3, 4, 5 and 6 of the first signal portion, cf. information referenced 25 and 26 in FIG. 3.

Then, the communication station detects the "i/a" code "10" and knows that time equalizer coefficients, an address and a mode code are stored for the station in the control bytes 1 to 6 of the first signal portion and extracts the information from the downlink signal.

The address denotes the address the processing unit has assigned to the station to be initialized. The communication station can now be recognized from its address by the central processing unit.

In addition, the communication station, by means of the address assigned thereto, knows in what signal portion in the downlink signal the control information for the station is stored. Furthermore, by means of the address assigned to the communication station, the station approximately knows at which instant during the time interval of a single frame in the uplink signal the information is to be presented to the uplink signal in the form of the second signal block. Besides, the communication station roughly knows from the assign information "audiochan. upl" and "d.ul" at what instants during the time interval of a frame in the uplink signal the information of the first and perhaps the third signal blocks is to be presented to the uplink signal. The exact positioning in time is realised by means of the time equalizer coefficients 25 and the fine adjustment by means of the dynamic time equalization to be discussed hereinafter.

The "mode" code in the part represented in FIG. 3 and denoted by 26 has the following connotation.

During normal operation of the communication system a communication station detects the address once per frame, in the present example once per 32 ms and, consequently, the communication station receives the control information only once per frame (32 ms). In some cases this may be too little: imagine, for example, the situation in which a communication station has adopted the voice switch mode. The transgression of the threshold by the microphone signal should then be detected by the central processing unit in the fastest manner possible, so that the processing unit can change the control information for that station in the downlink signal, more specifically, the assign information as fast as possible. The transmission rate of 32 ms of the control information from the central processing unit to the communication station and vice versa may then be too low.

The "mode" code in the part referenced 26 in FIG. 3 now denotes the "don't care bits" in the address. If the "mode" code, for example, denotes that the least significant bit of the address is a don't care bit, this implies that the communication station has actually been assigned two addresses. The communication station in that case receives twice as often the control information from the central processing unit, and vice versa.

As apparent from FIG. 3 the information includes extra coded parts referenced 25 and 26. Each even bit is the inverse of the immediately preceding odd bit. The control words 7 and 8 in the first signal part contain no information, which is shown in FIG. 3. Actually, at that point there is a gap in the serial data stream of the downlink signal.

Dynamic Time Equalization

Despite the fact that the communication station knows at what moment(s) the station is to communicate with the uplink signal by means of the time equalizer coefficients 25, it may happen that the delay of the signals from the communication station over the uplink is changed, for example, due to temperature changes. This means that there is a shift in time between the moment at which the communication station actually inserts the information in the uplink signal and the moment at which the communication station were desirably to insert the information in the uplink signal.

If there were no correction for this time shift, this could mean that this shift would become longer than the bit time so that decoding errors would occur in the central processing unit.

Dynamic time equalization works as follows. If during one or more frames in the uplink signal the control information in a second signal block inserted in the uplink signal by the communication station has not changed, the communication station will substitute the initialize signal 37 at the position of and for the control information in the second signal block. This is represented in FIG. 4. The processing unit 1 detects this initialize signal in the second signal block and determines the difference in time between the occurrence of this initialize signal in the uplink signal and the moment this initialize signal should desirably occur in the uplink signal.

The processing unit then generates a control signal as a function of this time difference. In the present example this is a binary signal denoting whether the initialize signal was detected late or early. This binary signal is included as "u/d" code in the downlink signal by means of the bits referenced 27 and applied to the communication station. The communication station detects the "u/d" code 27 and advances the instant at which its information is inserted in the uplink signal by a certain time interval if the "u/d" code has one value, denoting that the initialize signal was received late, and delays the instant at which its information is inserted if the "u/d" code has another value denoting that the initialize signal was received early.

Although a single bit would suffice for the "u/d" code 27, also in this case the code is split-phase encoded. The second bit is thus the inverse to the first bit.

If the time difference between the actual receive instant of the initialize signal in the second signal block in the uplink signal and the desired receive moment of the initialize signal would be too large after the dynamic time equalization described above has been performed once, the time equalization will be repeated. If no dynamic time equalization is necessary, the two-bit word "u/d" 27 becomes "11" or "00".

The gap 36A, as observed before, is intended to enable a communication station to introduce small time shifts of the instant at which information is inserted in the uplink signal in the form of the first, second and possibly third signal blocks.

In addition, this gap enables a communication station to be moved over a restricted distance without causing any disturbance in the uplink signal.

Another reason is that the sensitivity to signal reflections of the uplink signal is reduced. Furthermore, each signal block inserted in the uplink signal by a communication station slowly fades out. It is the specific function of the gap 36A to let this so-called signal echo fade out to such an extent that other stations are no longer annoyed by this echo. In order to provide that the gaps do not take up too much information area of the uplink signal, the information words inserted in the uplink signal by a station are optimally combined to signal blocks containing then more than one information word.

If, for example, successive audio words in the uplink signal were to be transmitted by different communication stations, a gap would have to be inserted between each audio word in the uplink signal. This would take up too much of the information area in the uplink signal.

From FIG. 4 it appears that 64 audio words in a first signal block of a specific communication station are combined. Furthermore, FIG. 4 shows that in the third signal blocks either 8 data words or 16 data words of a specific communication station are combined. In a signal block in the uplink signal there are no gaps, but there are gaps between signal blocks coming from different communication stations.

In the communication system explained with reference to the example shown in FIGS. 3 and 4, a maximum of 255 different addressable communication stations are possible, (a minimum of) 8 of which being passive as observed hereinbefore.

Needless to observe that if fewer stations are switched on, the central processing unit will need to generate less information and will receive less information. This implies that gaps will occur at several (different) places in the serial data stream of the uplink and downlink signals.

As observed above, signal blocks 1 to 255 in the downlink signal need not necessarily comprise the address word. Once the central processing unit in the initializing phase has applied the address information in the signal area 26, cf. FIG. 3, to a communication station, the communication station knows in what second signal area in the frames in the downlink signal the central processing unit has stored the control information for that station. Naturally, it is assumed that the processing unit accommodates the control information for the various communication stations in similar signal areas in succeeding frames. In order to enhance safety, the station verifies whether its address is really found at the expected location.

Central Processing Unit

Figure 6:
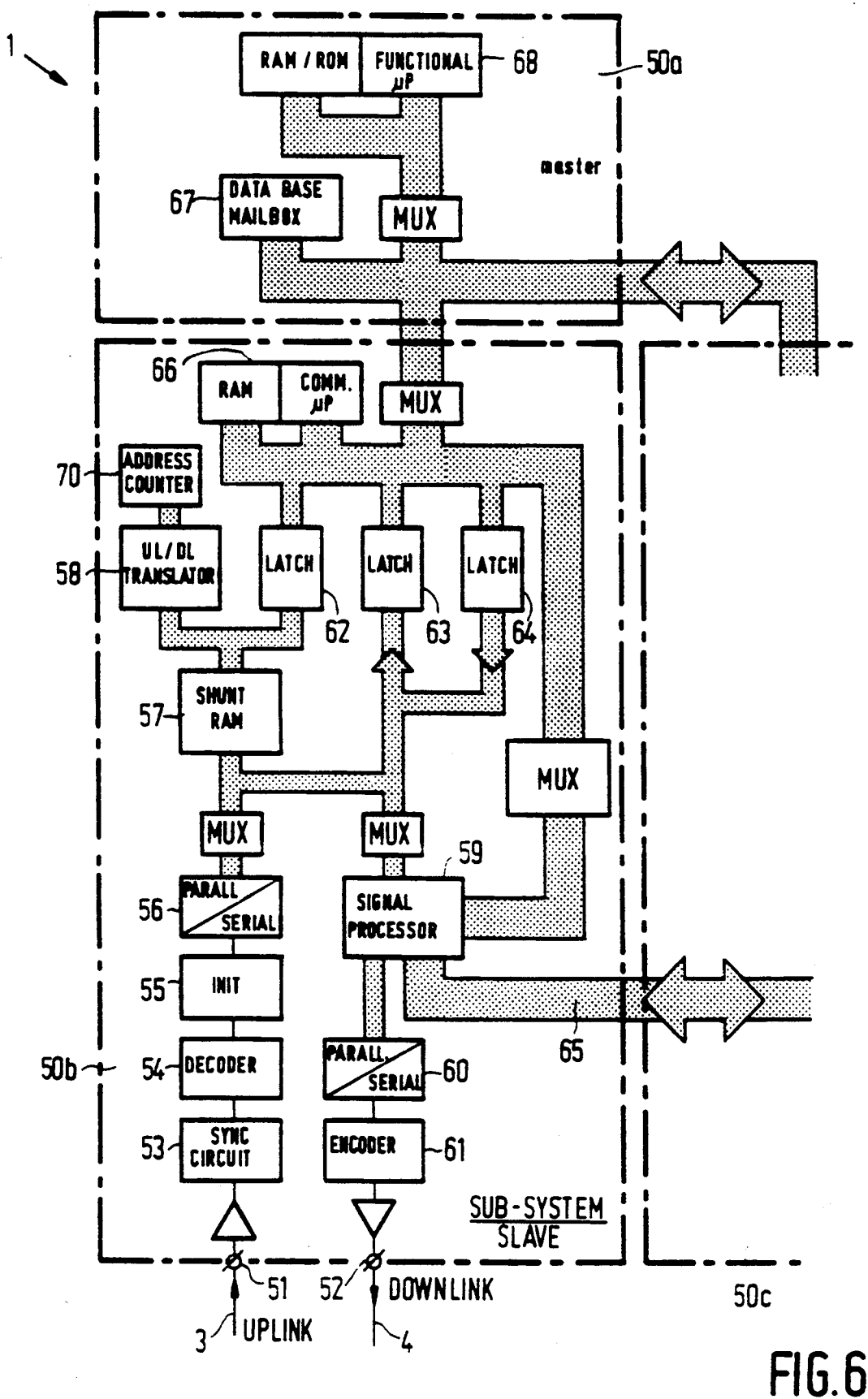
FIG. 6 shows an exemplary embodiment of the central processing unit to be used in the communication system.

FIG. 6 shows an embodiment of the central processing unit in the communication system according to the invention. The processing unit comprises two parts referenced 50a and 50b. The master unit of the processing unit is referenced 50a and the slave unit is referenced 50b. The master unit 50a is necessary when still further slave units such as slave unit 50c are present. This may be necessary if the communication system is to be extended for the case where more stations than 255 are necessary. The uplink 3 is coupled to the input of the slave unit 50b. The downlink 4 is coupled to the output 52 of the slave unit 50b.

The serial bit stream of the uplink signal which might still be coded is applied to the synchronizing (sync) circuit 53. In the sync circuit 53 the internal clock of the receiver section of the slave unit 50b is synchronized with the incoming bit stream and the word synchronization is realised for detecting 8-bit words in the uplink signal. In the decoder 54 the coded uplink signal is decoded into the uplink signal as represented in FIG. 4. In the initializing circuit 55 the initialize signal, 37 cf. FIG. 4, more specifically, the sync word in the initialize signal 37 is extracted from the serial bit stream of the uplink signal. The time difference between the detected sync word and the initialize signal 37 and the sync word generated by the central processing unit 1 itself in the downlink signal can be computed, which time difference can be used in the initializing phase for a communication station or for the dynamic time equalization.

In the serial-to-parallel converter 56 the uplink signal is converted into 8-bit parallel words stored in a shunt RAM 57 and from there applied to the uplink/downlink translator 58. In the translator 58 the information occur-ring in the uplink signal is converted into an information stream which forms the downlink signal. An address counter 70 then provides the addresses to be included in the signal blocks in the downlink signal.

The downlink signal is then applied to the parallel-to-serial converter 60 via the shunt RAM 57 and the signal processor 59, in which converter the 8-bit parallel words are converted into a serial data stream. Once the data stream has been encoded in the encoder 61, the coded downlink signal is presented at the output 52.

A plurality of latches, that is to say, latches 62, 63 and 64 make it possible for the communication processor 66 to contact the shunt RAM 57 directly so that this processor 66 can detect the control information in the second signal blocks of the uplink signal, in FIG. 4 the uplink status 31. If the processor 66 detects a change in this control information, the processor 66 sends this new control information to the mail box 67. A functional processor 68 reads the new control information from the mail box 67 and decides what action is to be taken. The processor 68 generates, for example, a new control information signal (new downlink status information, cf. the part of the status information in the downlink signal referenced 28 in FIG. 3), which is stored in the mail box 67 and then read out from this mail box 67 by the communication processor 66 and applied to the shunt RAM 57. From there the status information is again transported to the UL/DL translator 58 which provides that the new status information is inserted into the downlink signal at the proper position.

Furthermore, the communication processor 66 can provide data information for the downlink signal via the same latches 62 and 64.

The signal processor 59 operates under the control of the communication processor 66 which either or not receives instructions from the functional processor 68. The signal processor 59 is intended for controlling the transport of the downlink signal to the output 52 and the signal transport with a corresponding functional processor in the slave unit 50c, if present.

The conversion of the uplink signal to the downlink signal in the UL/DL translator 58 may be realised by means of a cross reference list or another algorithm. The implementation may be effected by means of a ROM or a RAM depending on the complexity desired. The address counter 70 generates addresses referring to locations in a frame in the uplink signal and, via this cross reference list, addresses referring to locations in a frame in the downlink signal are generated.

In this fashion the different channels in the uplink signal can be converted into channels in the downlink signal. As observed hereinbefore, the uplink statuses, block 31 in FIG. 4, are processed by the communication processor 66.

Downlink signals from the different slave units can be coupled under the control of the signal processor 59 over the bus 65.

Communication Station

Figure 7:
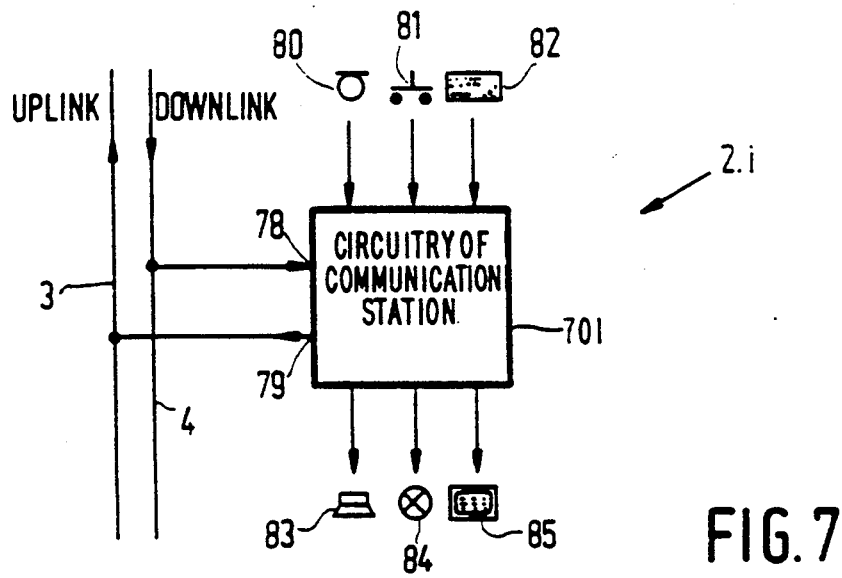
FIG. 7 shows an exemplary embodiment of a communication station to be used in the communication system.
Figure 8:
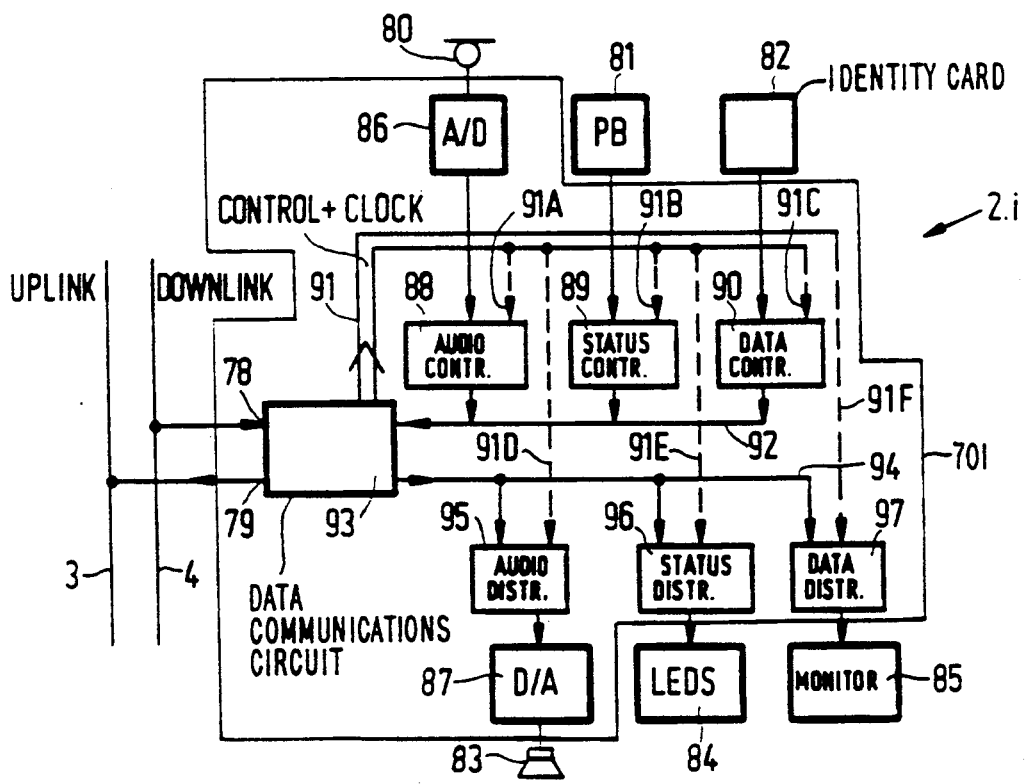
FIG. 8 gives a further elaboration of the communication station shown in FIG. 7.

FIGS. 7 and 8 show in diagrams a communication station 2.i as used, for example, in congress systems. FIG. 8 gives a more detailed representation of the station shown in FIG. 7. The communication station comprises circuitry 701, a microphone 80, one or more keys 81 and may comprise a reader for an identity card 82. The microphone 80 may apply audio information to the communication station where an A/D converter 86 converts this information into digital audio information to be inserted in the uplink signal. The key(s) 81 may be used for indicating that one wishes to make use of the microphone or that one wishes to vote.

The communication station 2.i further includes, for example, a loudspeaker 83, one or more leads 84 and a monitor 85. The digital audio information in an audio channel in the downlink signal destined for this communication station is converted in a D/A converter 87 into an analog audio signal made audible by the loudspeaker 83. The one or more leads 84 may give a confirmation of a depressed key or a confirmation of an identity card that has been read out. The monitor 85 can display the results of the vote or a personal message.

The information coming from the A/D converter 86, the key(s) 81 and the identity card reader 82 is applied to an internal uplink bus 92 through gate circuits 88, 89 and 90. This is effected in response to clock signals and control signals applied to the gate circuits over the control signal bus 91. The internal uplink bus 92 is coupled to a data communication circuit 93 establishing the link between the internal uplink bus 92 and the uplink 3 to the central processing unit 1. The information in the downlink signal over the uplink 4 is applied to an internal downlink bus 94 via the communication circuit 93.

Gate circuits 95, 96 and 97 extract the audio, control or data information respectively, destined for the communication station concerned from the downlink signal on the internal downlink bus 94, so as to apply this information to the D/A converter 87, the leads 84 and the monitor 85 respectively. The gate circuits 95, 96 and 97 also extract information from the downlink signal in response to clock signals and control signals fed to these gate circuits over the control signal bus 91.

The communication circuit 93 extracts the clock signals and control signals from the downlink signal arriving through input 78 over the control signal bus 91.

The operation of the communication circuit will be further explained with reference to the circuit shown in FIG. 9.

The input 78 of the communication circuit 93 is coupled to the input of a decoder 101 and to the input of a circuit 100. The output of the decoder 101 is coupled to the internal downlink bus 94 and applies the decoded downlink signal to the bus 94. The circuit 100 extracts an internal clock signal from the downlink signal and generates therefrom all the sync and timing signals. The clock signal is applied to the line 102 and the timing signals to the line 103. The clock signal on the line 102 is transported, for example, to the A/D and the D/A converters 86 and 87 in the communication stations.

During normal operation of the station the signal on the initialize control line 105 referenced "init control", is "low". The initialize request button on the station, connected to the line 105, is not/has not been depressed. The "low" state on the line 105 implies that the "i/a" code detector 107 is out of operation. The "assign" buffer 108 has stored the time equalizer coefficients, cf. FIG. 3 reference numeral 25, and the address assigned to the station by the central processing unit 1, cf. FIG. 3 reference numeral 26. The address stored in the "assign" buffer 108 is applied to an address detector 104 over the line 109. Over the line 110 the time equalizer coefficients are applied to a variable delay unit 111 in the uplink section of the station. Because the addresses in the downlink signal have a fixed order, the station knows when to expect its assigned address in the downlink signal. The address detector 104 having then read the address from the downlink signal compares the address to the address stored in the assign buffer 108. This comparison may be regarded as a verification for the station to find out whether the station is still correctly timed. If the two addresses match, the detector 104 supplies an enable signal over the line 106. In response to this enable signal applied to the control signal buffer 112, the control signal buffer 112 reads the uplink assign information: the "audiochan. upl+m" code 27' and the "d.ul" code 19' from the downlink signal on the internal downlink bus 94 and transports this uplink assign information to audio buffer 116 and data buffer 117 over the line 115. The "audiochan. upl+m" code is stored in the audio buffer 116 and the "d.ul" code is stored in the data buffer 117.

Furthermore, the control signal buffer 112 extracts from the downlink signal the downlink assign information: the "a.dl+m" code 19 and the "d.dl" code 18' and applies this downlink assign information to the audio timing unit 113 and data timing unit 114 over the line 115. The control signal buffer 112 further applies the enable code 18 to the unit 113. The audio timing unit 113 stores the "a.dl+m" code and the "enable" code and the data timing unit 114 stores the "d.dl" code. The audio timing unit 113 generates a control signal on the line 91D, which signal is applied to the gate circuit 95, cf. FIG. 8. The data timing unit 114 generates a control signal over the line 91F, which signal is applied to the gate circuit 97.

The detection of the "vs" bit 17 is of no major importance to the explanation of the communication station and will thus be dispensed with.

The control signal buffer 112 further generates a control signal which is applied to the gate circuit 96 over the line 91E.

In response to this control signal the gate circuit 96 detects from the signal portion in the downlink signal having the relevant station address, the downlink status referenced 28 in FIG. 3, and the remote control information, if available, and referenced 29 in FIG. 3.

In response to the "a.dl+m" code 19 and the "enable" code 18 stored in the audio timing unit 113, and the timing signal applied to the unit 113 over the line 103, the unit 113 sends control signals to the gate circuit 95 so that this gate circuit 95 detects just the audio words from the serial data stream of the downlink signal on bus 94 which are intended for the communication station and correspond to the "a.dl+m" code.

Under the influence of the "d.dl" code 18' stored in the data timing unit 114, and the timing signal applied to the unit 114 over the line 103, the unit 114 sends control signals to the gate circuit 97 so that this gate circuit 97 detects just the data words from the serial data stream of the downlink signal on bus 94 which are intended for the communication station and correspond to the "d.dl" code.

The timing signals for the uplink section of the communication station present on the line 120 are produced by the variable delay circuit 111 on the basis of the timing signals transported over the line 103 and the time equalizer coefficients transported over the line 110. If an audio channel in the uplink signal has been assigned to the communication station, the audio timing buffer 116 generates control signals in response to the timing signals of the circuit 111, which control signals are applied to the gate circuit 88 over the line 91A. In response to these control signals the audio samples of the A/D converter 86 are applied to the internal uplink bus 92 by the gate circuit 88 and, subsequently, stored in the audio buffer in the circuit 116. The audio buffer in the circuit 116 has a (minimum) capacity of 64 audio words of 8 bits each.

If a data channel in the uplink signal has been assigned to the communication station, the data timing buffer 117 generates control signals in response to the timing signals of the circuit 111, which control signals are applied to the gate circuit 90 over the line 91C. In response to these control signals data words are applied to the internal uplink bus 92 by the gate circuit 90 and, subsequently, these data words are stored in the data buffer in the circuit 117. The data buffer in the circuit 117 has a capacity of 16 data bytes of 8 bits each. If either the data channel 1 or data channel 2 is assigned to the communication station, this data buffer is completely filled before being read out each time. If the data channel 3 is assigned to the communication station, the buffer is read out after being half-filled.

The control and timing circuit 118 generates control signals over the line 91B which are applied to the gate circuit 89. In response to these control signals the control information, the uplink status referenced 31 in FIG. 4, is applied to the internal uplink bus 92 and stored in a memory in the circuit 118 by the gate circuit 89.

The timing signals on the line 120 drive the circuits 116, 117 and 118 in such a way that these circuits supply over the line 119 the first signal blocks comprising the 64 audio words per block, the second signal blocks comprising the control information and the third signal blocks comprising the 8 or 16 data words per block together with the uplink assign information at the proper instant in a frame. This line 120 leads to encoder 121. After encoding in this encoder 121 the signals are transported to the uplink 3 via an uplink switch 122 which is also controlled by the timing signals on line 120.

In the initializing phase for a communication station the user of the station depresses an "initialize request" button on the station as observed hereinbefore. Consequently, the signal on the line 105 becomes "high". This initializes the "i/a" code detector 117 and erases the memory in the "assign" buffer 108 which might still store an address and time equalizer coefficients. Upon detection of the "i/a" code "01" in the downlink signal, cf. FIG. 3, reference numeral 24, and denoting the initializing phase for the station, the detector 107 generate generates the control signal on line 123 which signal is applied to the control and timing circuit 118. In response to this control signal and the timing signal of the circuit 111 which now has a delay equal to zero, the circuit 118 produces the pattern referenced 37 in FIG. 4 (the uplink sync pattern) which the uplink switch 122 switches to the uplink signal at the instant of the initialize time slot 35.

As observed hereinbefore, the central processing unit then computes the time equalizer coefficients and assigns an address to the station. The "i/a" code detector 107 then detects the code "10" denoting the assign phase and applies a control signal to the assign buffer 108 which, subsequently, reads the address and the time equalizer coefficients, that is to say, the information referenced 25 and 26 in FIG. 3, from the downlink signal and stores this information in a memory. Subsequently, the buffer 108 generates an initialize confirmation over line 124, which is applied, for example, to a led.

The control signal buffer 112 further extracts the "u/d" signal 27, cf. FIG. 3, from the downlink signal.

This signal is necessary for the dynamic time equalization. From this "u/d" signal 27 the control signal buffer 112 extracts a control signal to be applied to the variable delay circuit 111 over the line 127. By means of this control signal the fine adjustment of the delay in the circuit 111 can be realised.

Figure 9:
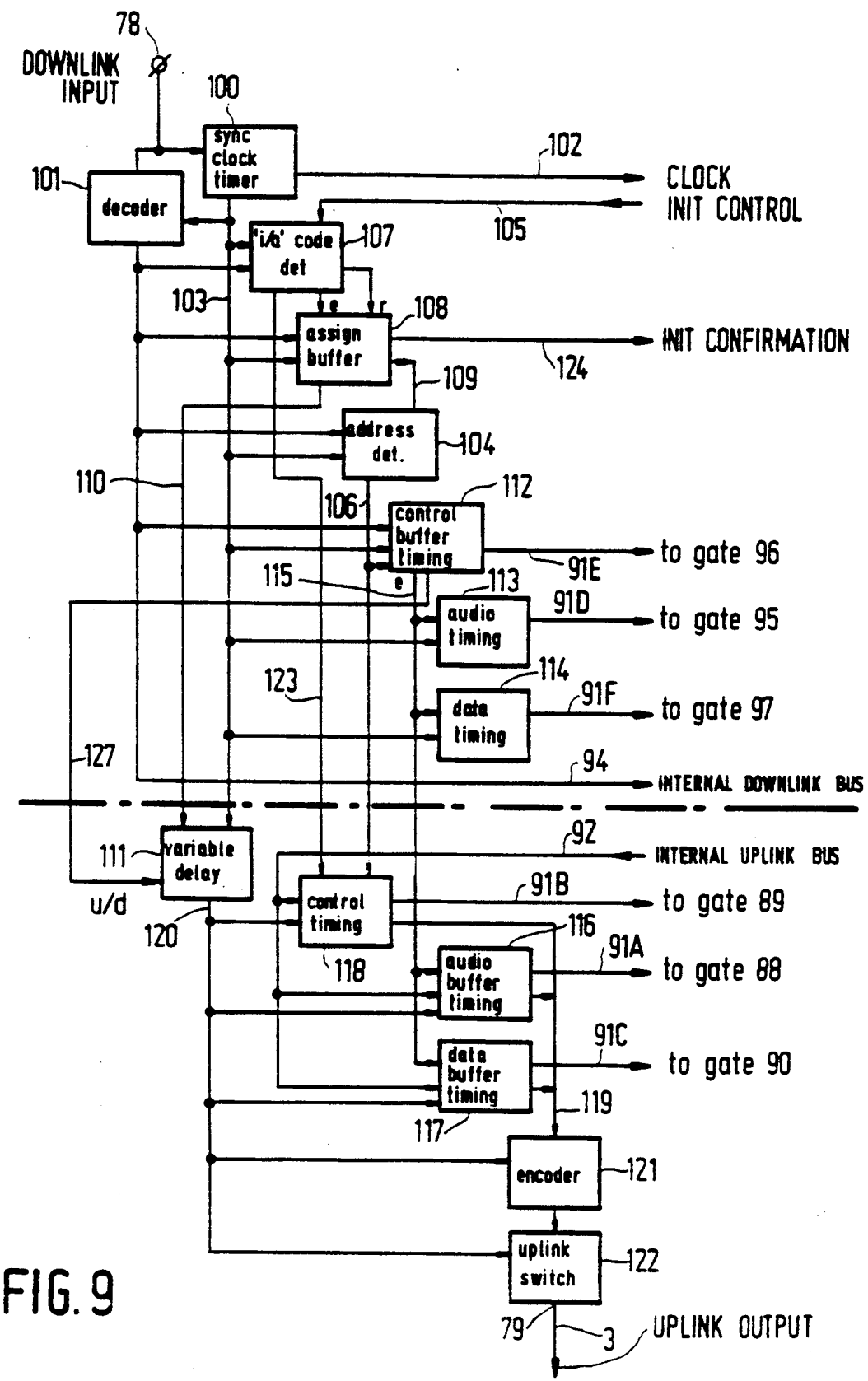
FIG. 9 shows a further detail of the communication station shown in FIG. 7.

Needless to observe that a passive station does not comprise the elements in the circuits shown in FIGS. 7, 8 and 9 relating to providing the contributions to the uplink signal.

To the circuit shown in FIG. 9 this implies that the part underneath the dash-and-dot line is absent and that, furthermore, the elements having reference numerals 107 and 108 may be omitted.

The element 104 has now stored a fixed address, i.e. one of the addresses of the signal components having reference numerals 248 to 255 in FIG. 3.

The communication system according to the invention as described with reference to the drawing Figures has great advantages compared to the present ring systems and prior-art packet switched systems.

The advantage over the present ring systems is that much simpler cablework will suffice. The cost of cablework will thus be much lower.

Compared to the system according to the invention a packet-switched system has a much larger overhead and the bit rate is accordingly higher. A packet-switched system is an asynchronous system compared to the communication system according to the invention, which is a synchronous system, synchronized by means of the sync words in the downlink signal.

In the data stream in a packet-switched system one does not know where the information exactly is. Each packet to be transported over the prior-art system is to be extended by information about which station has sent the packet and for which station the packet is destined.

In the system according to the invention the information in a frame in the uplink and downlink signals is precisely determined as regards its position in the frame, in the way that a station knows exactly at what position in a frame in the downlink signal the information destined for this station is to be found back by means of the assign information in the downlink signal, and knows exactly at what position in a frame in the uplink signal the station is to present the information destined for the central processing unit. The overhead may thus be much smaller.

It should be observed in this context that the invention is not restricted to the embodiments shown. The invention also applies to the embodiments differing at items which do not relate to the invention.

I claim:

1. A method for communicating in a communication system which includes a central processing unit and a number, N, of communication stations, where N≧2, the method including the steps of
   a) transmitting a downlink signal from the central processing unit to the communication stations on a downlink channel, the downlink signal having the form of successive frames, each frame having space for accommodating M signal blocks, the signal blocks each having space for accommodating audio information in the form of p respective audio words per signal block, the signal blocks including
      i) a first signal block including a synchronizing (sync) word, and
      ii) M−1 signal blocks, not including a the synchronizing word, having space for accommodating control information, the control information corresponding to a respective one of the communication stations, the control information being accommodated in a signal block comprising
         A) downlink assign information denoting which audio words, of the p audio words in each signal block in a frame, are destined for the respective one of the communication stations; and
         B) uplink assign information denoting which first signal block or blocks in a frame in an uplink signal are coming from the respective one of the communication stations
   b) transmitting the uplink signal from the communication stations to the central processing unit on an uplink channel which is separate from the downlink channel, the uplink signal having the form of successive frames, each frame having a time duration substantially equal to the time duration of the frames in the downlink signal, each frame having space for accommodating
      i) the first signal blocks, each first signal block having space for accommodating a number of audio words greater than one, and
      ii) second signal blocks, each second signal block having space for accommodating control information, signal blocks in the uplink signal coming from different communication stations being separated by gaps not containing any information.

2. Method as claimed in claim 1, characterized in that
the signal blocks in the downlink signal each have space for accommodating r data words,
the downlink assign information further denotes which data words of the r data words in the signal blocks in a frame are destined for the respective one of the communication stations,
each frame in the uplink signal has space for accommodating third signal blocks, each third signal block having space for accommodating a number of data words greater than one, and
the uplink assign information further contains information denoting which third signal block or blocks in a frame in the uplink signal are coming from the respective one of the communication stations.

3. Method as claimed in claim 1, characterized in that each frame in the uplink signal comprises a time slot for communication station's initialize signal during an initializing phase of the communication station to be initialized, the time duration of the time slot exceeding that of the initialize signal.

4. Method as claimed in claim 3, characterized in that the first signal block in a frame in the downlink signal in said initializing phase has space for time equalization information and address information, the address information being intended for the communication station to be initialized and denoting the communication station for which the time equalization information is destined.

5. Method as claimed in claim 4, wherein the time slot is the same as the space for accommodating control information.

6. Method as claimed in claim 5, characterized in that the control information in a signal block in the downlink signal belonging to a communication station may comprise time shift information for this communication station, which time shift information is intended for correcting the time equalization information.

7. Method as claimed in claim 3, wherein the time slot is the same as the space for accommodating control information.

8. Method as claimed in claim 4, characterized in that the address information applied during the initializing phase to a communication station to be initialized, denotes which second signal block in a frame in the uplink signal comes from said communication station.

9. A method for operating a central processing unit in a communication system which includes a number, N, of communication stations, where $N \geq 2$, the method including the steps of
   a) transmitting a downlink signal to the communication stations on a downlink channel, the downlink signal having the form of successive frames, each frame having space for accommodating M signal blocks, the signal blocks each having space for accommodating audio information in the form of p respective audio words per signal block, the signal blocks including
      i) a first signal block including a synchronizing (sync) word, and
      ii) M−1 signal blocks, not including a the synchronizing word, having space for accommodating control information, the control information corresponding to a respective one of the communication stations, the control information being accommodated in a signal block comprising
         A) downlink assign information denoting which audio words, of the p audio words in each signal block in a frame, are destined for the respective one of the communication stations; and
         B) uplink assign information denoting which first signal block or blocks in a frame in an uplink signal are coming from the respective one of the communication stations
   b) receiving the uplink signal from the communication stations on an uplink channel which is separate from the downlink channel, the uplink signal having the form of successive frames, each frame having a time duration substantially equal to the time duration of the frames in the downlink signal, each frame having space for accommodating
      i) the first signal blocks, each first signal block having space for accommodating a number of audio words greater than one, and
      ii) second signal blocks, each second signal block having space for accommodating control information; signal blocks in the uplink signal coming from different communication stations being separated by gaps not containing any information;
   c) extracting the first signal blocks in a frame coming from a first communication station from at least one first substantially fixed position in the successive frames in the uplink signal, said first fixed position or positions being related to the uplink assign information belonging to the first communication station; and
   d) the transmitting step including applying the audio words of the first signal blocks coming from the first communication station to a second communication station, said applying including inserting a successive audio word in at least one second fixed position in the successive blocks of a frame in the downlink signal, said second fixed position or positions being related to the downlink assign information for the second communication station.

10. Method as claimed in claim 9, wherein
    the signal blocks in the downlink signal each have space for accommodating r data words,
    the downlink assign information further denotes which data words of the r data words in the signal blocks in a frame are destined for the respective one of the communication station,
    each frame in the uplink signal has space for accommodating third signal blocks, each third signal block having space for accommodating a number of data words greater than one,
    the uplink assign information further contains information denoting which third signal block or blocks in a frame in the uplink signal are coming from the respective one of the communication stations,
    the method further comprising the steps of:
    for the supply of data words from the central processing unit to the second communication station, inserting a successive data word at least at one fixed position in in a frame in the downlink signal, and
    generating downlink assign information denoting which data words in the signal blocks of the frame are destined for the second communication station, the fixed position(s) of a (the) data word(s) in a signal block being related to said downlink assign information for the second communication station.

11. Method as claimed in claim 10, further comprising the steps of:
    for causing transmission of data words from the first communication station to the central processing unit, generating uplink assign information belonging to said first communication station, which assign information further denotes which third signal block, containing a number of data words greater than one, in a frame in the uplink signal is coming from this first communication station, and
    extracting the third signal block coming from said first communication station from a frame in the uplink signal in correspondence with the uplink assign information.

12. Method as claimed in claim 9, wherein each frame in the uplink signal comprises a time slot for a communication station's initialize signal during an initializing phase of the communication station to be initialized, the time duration of the time slot exceeding that of the initialize signal, the method further comprising the steps of:
    for initializing a communication station, generating and supplying to the downlink signal an initialize start signal for subsequently detecting an initialize signal in the time slot of a frame in the uplink signal, and for detecting a second instant at which the initialize signal is received relative to a first instant at which the initialize start signal is transmitted,
    for calculating, from second instant, time equalization information, which time equalization information is related to the distance of the uplink signal transmission path between the central processing unit and said communication station, and
    supplying an assign signal, address information and said time equalization information in a first signal block in a frame in the downlink signal.

13. Method as claimed in claim 12, further comprising the step of extracting one of the second signal blocks in the uplink signal, which one of the second signal blocks is coming from the first communication station and is located at a third substantially fixed position in the frame, said third fixed position being related to the address information applied to the first communication station during the initializing phase of this communication station.

14. The method of claim 12 further comprising the steps of generating a control signal as a function of a difference between the second instant and a desired receive instant of the initialize signal;
  transmitting the control signal as time shift information in one of the second signal blocks of the downlink signal, which one second signal block corresponds to the communication signal to be initialized.

15. A method for operating a communication station in a communication system which includes a central processing unit and a number, N, of communication stations, where N≧2, the method including the steps of
  a) receiving a downlink signal from the central processing unit on a downlink channel, the downlink signal having the form of successive frames, each frame having space for accommodating M signal blocks, the signal blocks each having space for accommodating audio information in the form of p respective audio words per signal block, the signal blocks including
    i) a first signal block including a synchronizing (sync) word, and
    ii) M−1 signal blocks, not including a the synchronizing word, having space for accommodating control information, the control information in at least one of the M−1 signal blocks corresponding to the communication station and comprising
      A) downlink assign information denoting which audio words, of the p audio words in that signal block or blocks, are destined for the communication station; and
      B) uplink assign information denoting which first signal block or blocks in a frame in an uplink signal are to come from the communication station;
  b) extracting control information belonging to the communication station from the downlink signal;
  c) extracting from the control information the downlink assign information and the uplink assign information for the communication station;
  d) extracting an audio word from at least one fixed frame position in the downlink signal based on the downlink assign information;
  e) transmitting portions of the uplink signal to the central processing unit on an uplink channel which is separate from the downlink channel, the uplink signal having the form of successive frames, each frame having a time duration substantially equal to the time duration of the frames in the downlink signal, each frame having space for accommodating
    i) the first signal blocks, each first signal block having space for accommodating a number of audio words greater than one, and
    ii) second signal blocks, each second signal block having space for accommodating control information, signal blocks in the uplink signal coming from different communication stations being separated by gaps not containing any information, the transmitting step including supplying at least one first signal block containing audio words and a second signal block containing control information at least one substantially fixed second frame position the in the uplink signal, the second frame position resulting from the uplink assign information.

16. Method as claimed in claim 15, in wherein
  the signal blocks in the downlink signal each have space for accommodating r data words,
  the downlink assign information further denotes which data words of the r data words in the signal blocks in a frame are destined for said communication station,
  each frame in the uplink signal has space for accommodating third signal blocks, each third signal block having space for accommodating a number of data words greater than one,
  the uplink assign information further contains information denoting which third signal block or blocks in a frame in the uplink signal are coming from said communication station,
  the method further comprising the step of, for sending data words from the communication station to the central processing unit supplying the third signal block containing data words in the uplink signal at a frame position related to the uplink assign information for said communication station.

17. Method as claimed in claim 16, further comprising for receiving data words from the central processing unit, extracting a successive data word from at least one fixed frame position related to said downlink information for said communication station.

18. The method of claim 16, wherein the first signal block in a frame in the downlink signal in an initialization phase has space for equalization and address information intended for the communication station; and further comprising the steps of,
  during the initialization phase, supplying an initialization signal in the space for accommodating control information in one of the second signal blocks of the uplink signal, if the control information of the communication station has not changed during one or more previous frames;
  detecting time shift information in the control information belonging to the communication station in a signal block in the downlink signal;
  advancing or just delaying the instant at which the first, second, and third signal blocks are supplied to the uplink signal in response to the time shift information.

19. Method as claimed in claim 15, wherein each frame in the uplink signal comprises a time slot for a communication station's initialize signal during an initializing phase of the communication station, the time duration of the time slot exceeding that of the initialize signal, the method further comprising
  for initializing the communication station, detecting an initialize start signal in the downlink signal,
  subsequently generating an initialize signal and supplying the initialize signal in the uplink signal at an instant so that the initialize signal is located in the time slot of a frame in the uplink signal,
  detecting an assign signal, address information and time equalization information in the first signal block in a frame in the downlink signal.

20. Method as claimed in claim 19, further comprising supplying the first and second signal blocks in the uplink signal in response to the time equalization information at an instant so that the first and second signal blocks of the uplink signal supplied to the uplink signal by the communication station are separated from uplink signal blocks supplied by different communication stations by gaps not containing any information.

21. Method as claimed in claim 20, further comprising supplying the third signal blocks to the uplink signal in response to the time equalization information at an instant so that the third signal blocks in the uplink signal supplied to the uplink signal by the communication station are separated from uplink signal blocks supplied by different communication stations by gaps not containing any information.

22. The method of claim 15
wherein the first signal block in a frame in the downlink signal in an initialization phase has space for equalization and address information intended for the communication station;
further comprising the step of, during the initialization phase, supplying an initialization signal in the space for accommodating control information in one of the second signal blocks of the uplink signal, if the control information of the communication station has not changed during one or more previous frames.

23. Method as claimed in claim 22, further comprising the steps of:
detecting time shift information in the control information belonging to the communication station in a signal block in the downlink signal, and
advancing or just delaying the instant at which the first and second signal blocks are supplied to the uplink signal in response to the time shift information.

24. Method as claimed in claim 22 wherein said second frame position is related to the address information.

25. A method for operating a communication station in a communication system which includes a central processing unit and a number, N, of communication stations, where $N \geq 2$, the method including the steps of
a) receiving a downlink signal from the central processing unit on a downlink channel, the downlink signal having the form of successive frames, each frame having space for accommodating M signal blocks, the signal blocks each having space for accommodating audio information in the form of p respective audio words per signal block, the signal blocks including
  i) a first signal block including a synchronizing (sync) word, and
  ii) M−1 signal blocks, not including a the synchronizing word, having space for accommodating control information, the control information in at least one of the M−1 signal blocks corresponding to the communication station and comprising
    A) downlink assign information denoting which audio words, of the p audio words in that signal block or blocks, are destined for the communication station; and
    B) uplink assign information denoting which first signal block or blocks in a frame in an uplink signal are to come from the communication station;
b) extracting control information belonging to the communication station from the downlink signal;
c) extracting from the control information the downlink assign information for the communication station;
d) extracting an audio word from at least one fixed frame position in the downlink signal based on the downlink assign information;
e) transmitting portions of the uplink signal to the central processing unit on an uplink channel which is separate from the downlink channel, the uplink signal having the form of successive frames, each frame having a time duration substantially equal to the time duration of the frames in the downlink signal, each frame having space for accommodating
  i) the first signal blocks, each first signal block having space for accommodating a number of audio words greater than one, and
  ii) second signal blocks, each second signal block having space for accommodating control information, signal blocks in the uplink signal coming from different communication stations being separated by gaps not containing any information.

* * * * *